United States Patent
Aoki et al.

(10) Patent No.: US 6,781,678 B2
(45) Date of Patent: Aug. 24, 2004

(54) MEASURING METHOD AND MEASURING APPARATUS OF WAVELENGTH DISPERSION DISTRIBUTION CHARACTERISTICS OF OPTICAL FIBER

(75) Inventors: Shoichi Aoki, Tokyo (JP); Yoshimitsu Asahina, Tokyo (JP); Takao Suzuki, Tokyo (JP)

(73) Assignee: Ando Electric Co., Ltd., Tokyo (JP)

(*) Notice: Subject to any disclaimer, the term of this patent is extended or adjusted under 35 U.S.C. 154(b) by 0 days.

(21) Appl. No.: 10/279,268

(22) Filed: Oct. 24, 2002

(65) Prior Publication Data

US 2003/0081199 A1 May 1, 2003

(30) Foreign Application Priority Data

Oct. 26, 2001 (JP) .................................... P2001-329160

(51) Int. Cl.[7] .............................................. G01N 21/00
(52) U.S. Cl. ..................................................... 356/73.1
(58) Field of Search ..................... 356/73.1; 385/12–16, 385/100; 250/227.11, 227.17, 227.15

(56) References Cited

U.S. PATENT DOCUMENTS

| | | | | |
|---|---|---|---|---|
| 5,455,672 A | | 10/1995 | Lamonde et al. | |
| 5,956,131 A | * | 9/1999 | Mamyshev et al. | 356/73.1 |
| 6,067,149 A | | 5/2000 | Gripp et al. | |
| 6,118,523 A | * | 9/2000 | Brener et al. | 356/73.1 |
| 6,453,082 B1 | * | 9/2002 | Watanabe | 385/15 |
| 6,587,607 B2 | * | 7/2003 | Aoki et al. | 385/15 |

* cited by examiner

Primary Examiner—Tu T. Nguyen
(74) Attorney, Agent, or Firm—Fish & Richardson P.C.

(57) ABSTRACT

A wavelength dispersion distribution measuring apparatus of an optical fiber includes light signal generation section 1, 2 for generating two light signals with different wavelengths, section 3, 4 for combining the signals and shaping a light pulse signal, directional coupling section 6 for inputting the light pulse signal to one end or the other end of a measured optical fiber and also branching total back-scattered light from the measured optical fiber, wavelength extraction section 9 for passing only a wavelength component of one of four-wave mixed light generated by interaction of two wavelengths launched, measuring section 10 for measuring wavelength dispersion distribution data, changeover section 12-1 to 12-3 for switching the input side and the terminal side of the light pulse from one end to the other end of the measured optical fiber, and calculation section 11 for performing superimposition processing of two measured results associated with the switching.

5 Claims, 4 Drawing Sheets

MEASURING METHOD AND MEASURING APPARATUS OF WAVELENGTH DISPERSION DISTRIBUTION CHARACTERISTICS OF OPTICAL FIBER

BACKGROUND OF THE INVENTION

The present invention relates to measurement of wavelength dispersion distribution of an optical fiber, and particularly to a new measuring method and measuring apparatus useful for measurement of wavelength dispersion distribution of a long optical fiber.

In an ultra high-speed optical communication field at present, in order to implement and maintain high quality of communication, various researches have been advanced with respect to communication quality control and compensation technique of an optical fiber line.

With that, the need for characteristic evaluations of an optical fiber from the market is also increasing more than ever.

Among them, wavelength dispersion distribution characteristics of the optical fiber have been noted as an important item for evaluating limits of a transmission speed and a wavelength band.

Then, as an example of measurement of wavelength dispersion distribution of the optical fiber of this kind, an example described in JP-A-10-83006 is known.

A principle of measurement of wavelength dispersion distribution of the optical fiber will be described using a diagram showing a conventional configuration of a wavelength dispersion distribution measuring apparatus of an optical fiber of FIG. 2.

In FIG. 2, numeral 1 is a laser source 1 (LS1) for generating coherent light of a wavelength $\lambda1$, and numeral 2 is a laser source 2 (LS2) for generating coherent light of a wavelength $\mu2$, and the two light is combined by a coupler 3.

The light combined by the coupler 3 is shaped in pulse shape in synchronization with a clock signal (not shown) by an AO switch 4 and is amplified by an erbium doped fiber amplifier (EDFA) 5.

The light amplified by the erbium doped fiber amplifier 5 is emitted to an optical fiber 7 which is a measurement target by an optical circulator 6.

Also, the optical circulator 6 branches total back-scattered light generated by light launched into the optical fiber 7 and passes only light of a particular wavelength component through an optical band pass filter 9 to give it to an OTDR (optical time domain reflectometer) 10.

A terminator 8 suppresses Fresnel reflection in the far end of the optical fiber 7.

Incidentally, the optical band pass filter performs a function of extracting a wavelength component of one of four-wave mixed light generated by interaction of two wavelengths launched among the total back-scattered light by a light pulse signal inputted to a measured optical fiber.

In the OTDR 10, intensity variation data of the total back-scattered light of the optical fiber 7 which is a measurement target is calculated based on particular wavelength light passing only a wavelength component of one of four-wave mixed light generated by interaction of two wavelengths launched among the total back-scattered light by the optical band pass filter 9.

The intensity variation data of the total back-scattered light calculated by the OTDR 10 is stored in RAM within a PC (personal computer) 11 and is used for various calculations.

A conventional procedure of measurement of wavelength dispersion distribution characteristics of FIG. 2 will be described in detail using FIG. 3.

As shown in FIG. 2, in a state of connecting a measured optical fiber 7 to a measuring apparatus, in the case of starting measurement of dispersion distribution characteristics of the measured optical fiber, First, measurement conditions of the two laser sources 1, 2 of different wavelengths, the OTDR and the EDFA are set (step S11).

After setting the measurement conditions of step S11, measurement of intensity variation data of total back-scattered light of the measured optical fiber is made by the OTDR (step S12).

The measured data measured in step S12 is given to a personal computer (step S13).

Calculation processing of a wavelength dispersion value etc. is performed by processing the measured data from the OTDR by the personal computer (step S14).

Numerical values and waveforms of the wavelength dispersion value and total dispersion value obtained by the processing of step S14 are displayed on a display part (not shown) (step S15).

However, in measurement of the conventional wavelength dispersion distribution measuring apparatus as described in FIG. 2, measurement of dispersion distribution characteristics was made from one side of the measured optical fiber, so that when the measured optical fiber is long, there was a problem that measurement of dispersion distribution of the far end of the measured optical fiber cannot be made accurately due to shortage of output of optical power emitted to the measured optical fiber.

SUMMARY OF THE INVENTION

A problem (object) of the invention is to provide a measuring method and a measuring apparatus capable of making accurate measurement of wavelength dispersion distribution characteristics with respect to a long measured optical fiber.

In order to solve the problem, in a measuring method for combining two input light with different wavelengths and emitting a light pulse signal shaped in a pulse waveform to a measured optical fiber and detecting a wavelength component of one of four-wave mixed light generated by interaction of two wavelengths launched among total back-scattered light from the measured optical fiber by an OTDR (optical time domain reflectometer) and measuring wavelength dispersion distribution characteristics of the measured optical fiber, wavelength dispersion distribution characteristics of the optical fiber are measured by the steps of emitting the light pulse signal from one end of the measured optical fiber and measuring a first wavelength dispersion distribution characteristic of the measured optical fiber, emitting the light pulse signal from the other end of the measured optical fiber and measuring a second wavelength dispersion distribution characteristic of the measured optical fiber, and performing superimposition processing of measured results of the first and second wavelength dispersion distribution characteristics, and thereby measurement in which shortage of output of optical power is compensated can be made even for a long measured optical fiber (aspect 1).

Also, the measured results are displayed by a step of displaying numerical values and waveforms of a wavelength dispersion value and a total dispersion value obtained while performing the superimposition processing by a CPU (aspect 2).

Also, automatic measurement can be made by performing a step of switching changeover switches connected before starting measurement in order to emit the light pulse signal to either of both ends of the measured optical fiber between the step of measuring the first wavelength dispersion distribution characteristic and the step of measuring the second wavelength dispersion distribution characteristic (aspect 3).

Also, a wavelength dispersion distribution measuring apparatus of an optical fiber is constructed of light signal generation section for generating two light signals with different wavelengths, section for combining the two light signals with different wavelengths and shaping the signals into a light pulse signal, directional coupling section for inputting the light pulse signal to one end or the other end of a measured optical fiber and also branching total back-scattered light from the measured optical fiber, wavelength extraction section for passing only a wavelength component of one of four-wave mixed light generated by interaction of two wavelengths launched among the total back-scattered light branched, measuring section for measuring wavelength dispersion distribution data from the wavelength component extracted, changeover section which is provided between the directional coupling section and the measured optical fiber and switches the input side and the terminal side of the light pulse from one end to the other end of the measured optical fiber, and calculation section for performing superimposition processing of two measured results associated with switching by the changeover section (aspect 4).

Also, the changeover section comprises first and second changeover switches for selectively performing switching to the side connected to both of the end sides of the measured optical fiber respectively and the side connected to the terminator side respectively, and a third changeover switch for selectively switching the measured optical fiber side of the first and second changeover switches to the input side of the light pulse signal (aspect 5).

DETAILED DESCRIPTION OF THE PREFERRED EMBODIMENTS

Figure 4:
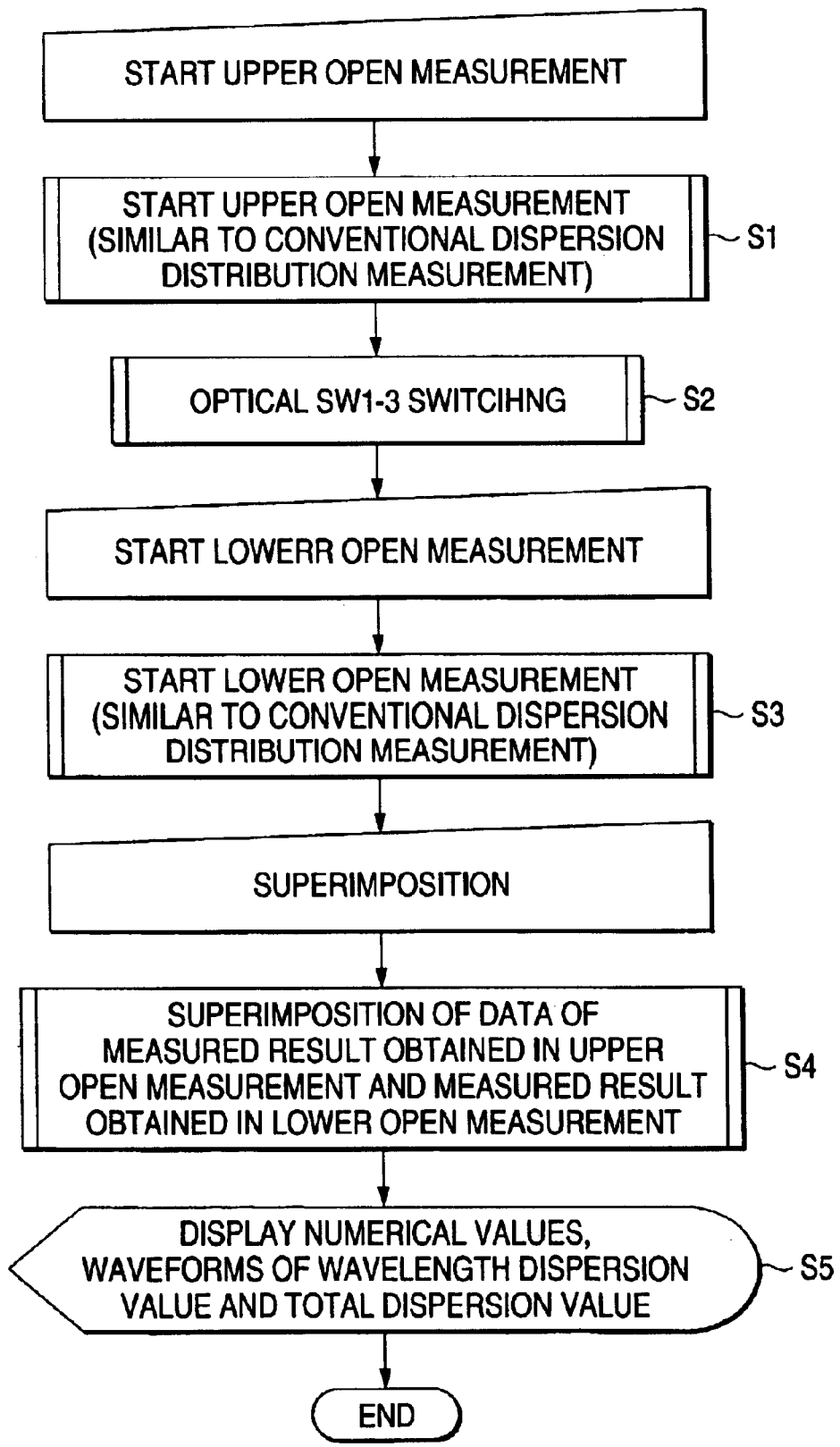
FIG. 4 is a flowchart showing a procedure of measurement of wavelength dispersion distribution characteristics of the invention.

Next, a configuration and operation of a wavelength dispersion distribution measuring apparatus of an optical fiber of the invention will be described using FIGS. 1 and 4.

Figure 1:
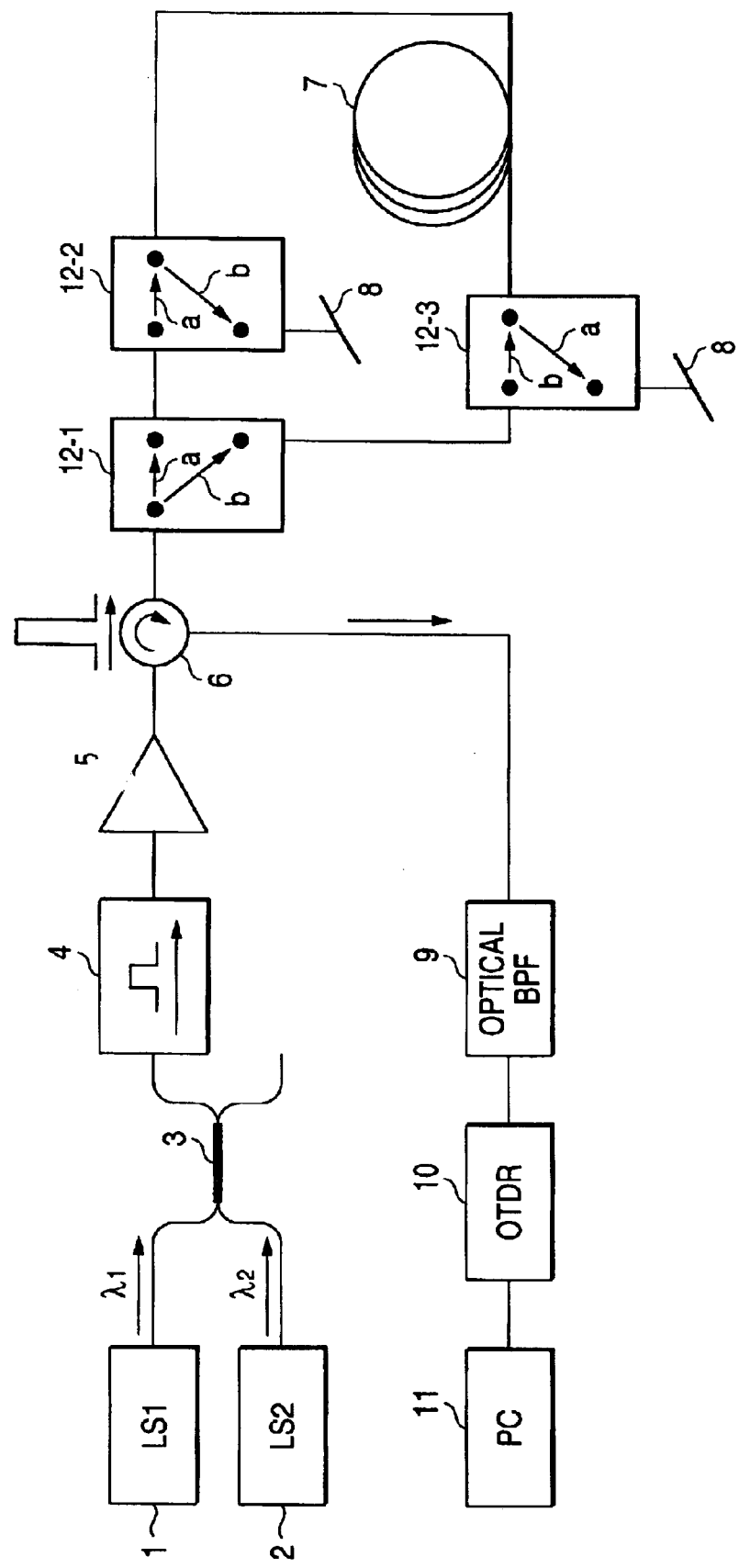
FIG. 1 is a diagram showing a configuration of a measuring apparatus of wavelength dispersion distribution characteristics of the invention.
Figure 2:
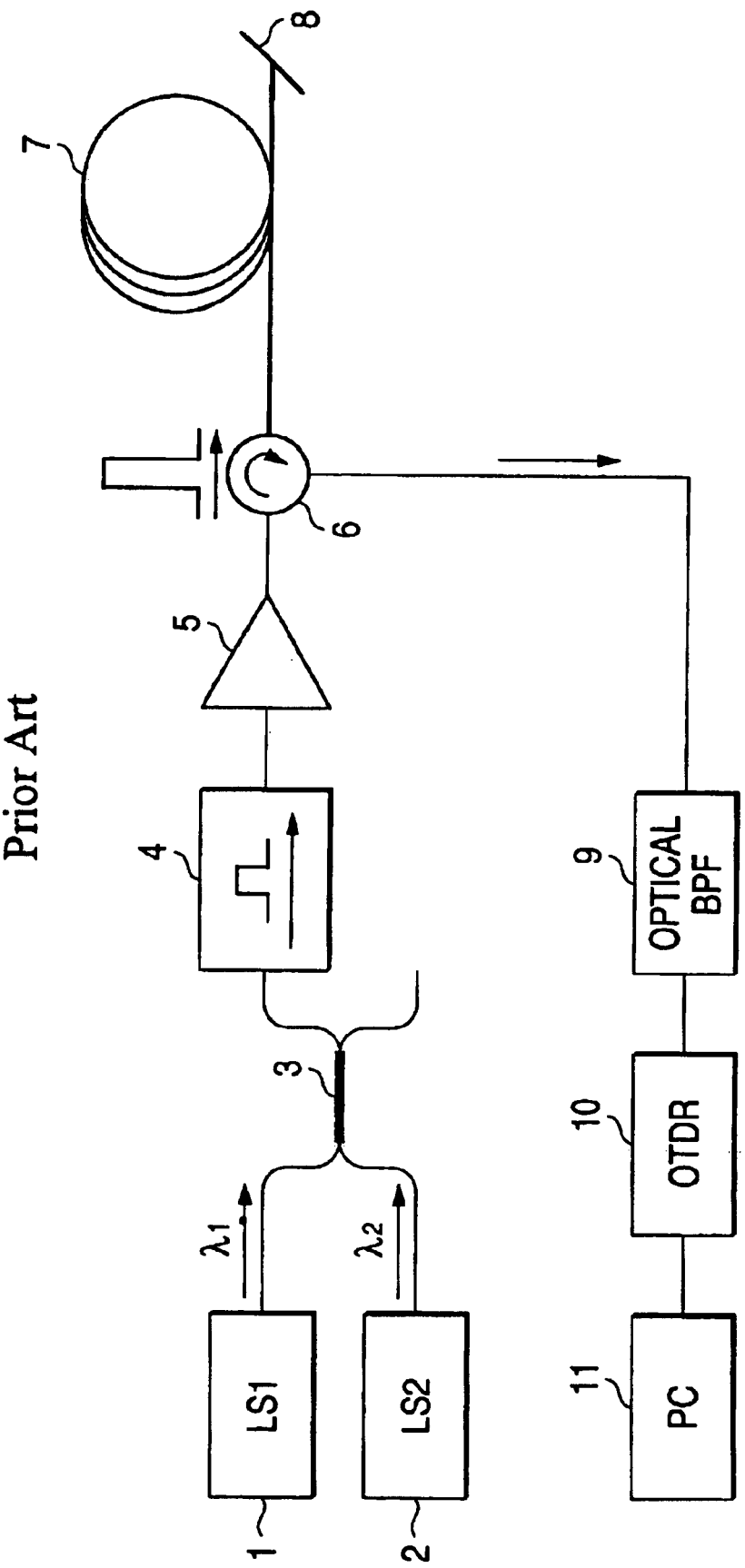
FIG. 2 is a diagram showing a conventional configuration of a measuring apparatus of wavelength dispersion distribution characteristics.

In FIG. 1, numeral 1 is a laser source 1 (LS1) for generating coherent light of a wavelength $\lambda 1$, and numeral 2 is a laser source 2 (LS2) for generating coherent light of a wavelength $\mu 2$, and the two light is combined by a coupler 3.

The light combined by the coupler 3 is shaped in pulse shape in synchronization with a clock signal (not shown) by an AO switch 4 and is amplified by an erbium doped fiber amplifier (EDFA) 5.

The light amplified by the erbium doped fiber amplifier 5 is emitted to an optical fiber 7 which is a measurement target through changeover section described below by an optical circulator 6.

Also, the optical circulator 6 branches total back-scattered light generated by light launched into the optical fiber 7 through the changeover section described below and passes only a wavelength component of one of four-wave mixed light generated by interaction of two wavelengths launched among the total back-scattered light through an optical band pass filter 9 to give it to an OTDR (optical time domain reflectometer)

A terminator 8 suppresses Fresnel reflection in the far end of the optical fiber 7.

In the OTDR 10, intensity variation data of the total back-scattered light of the optical fiber 7 which is a measurement target is calculated based on particular wavelength light passing only a wavelength component of one of four-wave mixed light generated by interaction of two wavelengths launched among the total back-scattered light by the optical band pass filter 9.

The intensity variation data of the total back-scattered light calculated by the OTDR 10 is stored in RAM within a PC (personal computer) 11 and is used for various calculations.

A configuration of the wavelength dispersion distribution characteristic measuring apparatus of the invention differs from that of the conventional apparatus in that changeover section is provided.

In an embodiment of FIG. 1, the changeover section comprises three changeover switches 12-1, 12-2, 12-3, and is constructed so that switching can simply be performed to a state of inputting a light pulse signal from one end and a state of inputting the light pulse signal from the other end with respect to the measured optical fiber 7 by connecting the three changeover switches as shown in FIG. 1.

Incidentally, it is constructed so that the other end is connected to the terminator 8 when the light pulse signal is inputted from one end of the measured optical fiber and one end is connected to the terminator 8 when the light pulse signal is inputted from the other end.

Next, a procedure of measurement of wavelength dispersion distribution characteristics of the invention of FIG. 1 will be described in detail using FIG. 4.

In the configuration of FIG. 1, a state in which the three changeover switches 12-1, 12-2 and 12-3 are switched to the side of a is called an upper open state, and a state in which the three changeover switches 12-1, 12-2 and 12-3 are switched to the side of b is called a lower open state.

In the measurement of wavelength dispersion distribution characteristics of the invention, superimposition processing of both measured results is performed after making measurement in the upper open state and measurement in the lower open state.

Figure 3:
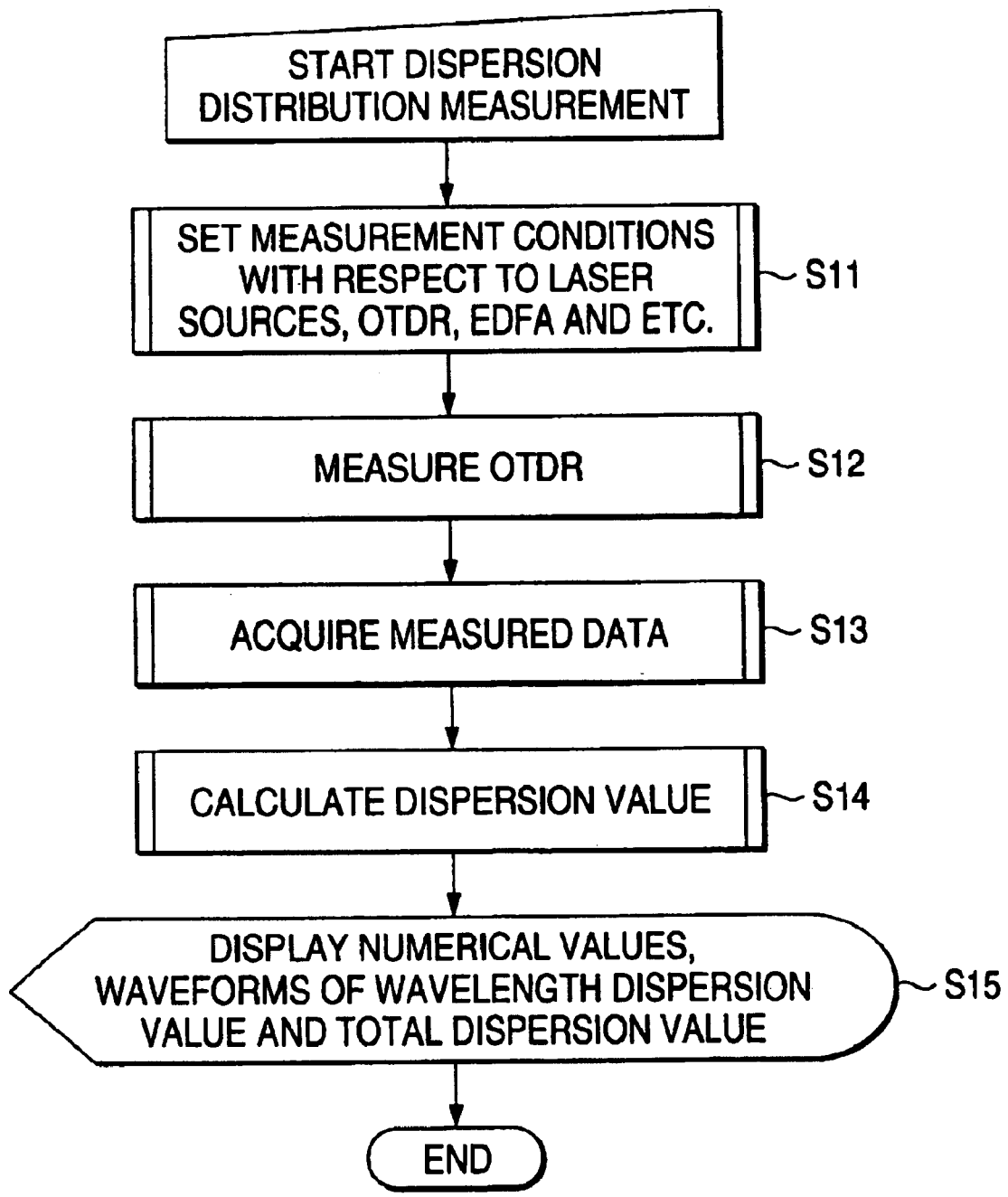
FIG. 3 is a flowchart showing a conventional procedure of measurement of wavelength dispersion distribution characteristics.

In the configuration of FIG. 1, first, in a state (upper open state) in which the three changeover switches are switched to the side of a, steps S11 to S14 of FIG. 3 are performed to calculate a dispersion value and a measured result is acquired (step S1)

After completing measurement in the upper open state, the three changeover switches 12-1 to 12-3 are switched to the side of b (step S2).

In this state, steps S11 to S14 of FIG. 3 are performed to calculate a dispersion value and a measured result is acquired (step 33).

Superimposition processing of the measured results acquired in step S1 and step S3 is performed (step S4).

Numerical values and waveforms of the wavelength dispersion value and total dispersion value obtained by the processing of step S4 are displayed on a display part (not shown) (step S5).

The superimposition processing in step S4 can be performed properly, for example, the measured result of upper open measurement and the measured result of lower open measurement of the measured optical fiber are adopted half-and-half, or when two kinds of fibers with different characteristics are connected in the measured optical fiber, measured results of upper open measurement and lower open measurement to its connection point are adopted.

In the invention according to aspect 1, in a measuring method for combining two input light with different wavelengths and emitting a light pulse signal shaped in a pulse waveform to a measured optical fiber and detecting a wavelength component of one of four-wave mixed light generated by interaction of two wavelengths launched among total back-scattered light from the measured optical fiber by an OTDR (optical time domain reflectometer) and measuring wavelength dispersion distribution characteristics of the measured optical fiber, wavelength dispersion distribution characteristics of the optical fiber are measured by the steps of emitting the light pulse signal from one end of the measured optical fiber and measuring a first wavelength dispersion distribution characteristic of the measured optical fiber, emitting the light pulse signal from the other end of the measured optical fiber and measuring a second wavelength dispersion distribution characteristic of the measured optical fiber, and performing superimposition processing of measured results of the first and second wavelength dispersion distribution characteristics, and thereby high accurate measurement in which shortage of output of optical power is compensated can be made even for a long measured optical fiber.

Also, in the invention according to aspect 2, even for a long measured optical fiber, the measured results in which shortage of output of optical power is compensated can be displayed by a step of displaying numerical values and waveforms of a wavelength dispersion value and a total dispersion value obtained while performing the superimposition processing by a CPU.

Also, in the invention according to aspect 3, even in the case of measurement of a long measured optical fiber, automatic measurement can be made without reconnecting a measuring apparatus to a measured optical fiber by performing a step of switching changeover switches connected before starting measurement in order to emit the light pulse signal to either of both ends of the measured optical fiber between the step of measuring the first wavelength dispersion distribution characteristic and the step of measuring the second wavelength dispersion distribution characteristic.

Also, in the invention according to aspect 4, even in the case of measurement of a long measured optical fiber, a wavelength dispersion distribution measuring apparatus of an optical fiber capable of making automatic measurement without reconnecting a measuring apparatus to a measured optical fiber can be constructed of light signal generation section for generating two light signals with different wavelengths, section for combining the two light signals with different wavelengths and shaping the signals into a light pulse signal, directional coupling section for inputting the light pulse signal to one end or the other end of a measured optical fiber and also branching total back-scattered light from the measured optical fiber, wavelength extraction section for passing only a wavelength component of one of four-wave mixed light generated by interaction of two wavelengths launched among the total back-scattered light branched, measuring section for measuring wavelength dispersion distribution data from the wavelength component extracted, changeover section which is provided between the directional coupling section and the measured optical fiber and switches the input side and the terminal side of the light pulse from one end to the other end of the measured optical fiber, and calculation section for performing superimposition processing of two measured results associated with switching by the changeover section.

Also, in the invention according to aspect 5, the changeover section can comprise first and second changeover switches for selectively performing switching to the side connected to both of the end sides of the measured optical fiber respectively and the side connected to the terminator side respectively, and a third changeover switch for selectively switching the measured optical fiber side of the first and second changeover switches to the input side of the light pulse signal.

Then, switching can also be performed simultaneously by interlocking the three changeover switches.

What is claimed is:

1. A wavelength dispersion distribution measuring method comprising:

combining two input light signals with different wavelengths into a light pulse signal, inputting the light pulse signal into an optical fiber, detecting a wavelength component of one of four-wave mixed light generated by interaction of two wavelengths launched among total back-scattered light from the optical fiber by an optical time domain reflectometer, measuring wavelength dispersion distribution characteristics of the optical fiber, wherein the measuring includes:

emitting the light pulse signal from a first end of the optical fiber and measuring a first wavelength dispersion distribution characteristic of the optical fiber, emitting the light pulse signal from a second end of the optical fiber and measuring a second wavelength dispersion distribution characteristic of the optical fiber, and performing superimposition processing of measured results of the first and second wavelength dispersion distribution characteristics.

2. The wavelength dispersion distribution measuring method of an optical fiber according to claim 1, further comprising:

displaying numerical values and waveforms of a wavelength dispersion value and a total dispersion value obtained while performing the superimposition processing by a CPU.

3. The wavelength dispersion distribution measuring method of an optical fiber according to claim 1, further comprising:

switching changeover switches connected before starting measurement in order to emit the light pulse signal to either of both ends of the measured optical fiber between measuring the first wavelength dispersion distribution characteristic and measuring the second wavelength dispersion distribution characteristic.

4. A wavelength dispersion distribution measuring apparatus of an optical fiber, comprising:

a light signal generation section for generating two light signals with different wavelengths, a section for combining the two light signals with different wavelengths and shaping the signals into a light pulse signal, a directional coupling section for inputting the light pulse signal to one end or the other end of a measured optical fiber and also branching total back-scattered light from the measured optical fiber, a wavelength extraction section for passing only a wavelength component of one of four-wave mixed light generated by interaction of two wavelengths launched among the branched total back-scattered light, a measuring section for measuring wavelength dispersion distribution data from the extracted wavelength component, a changeover section which is provided between said directional coupling section and the measured optical fiber and switches the input side and the terminal side of the light pulse from one end to the other end of the measured optical fiber, and a calculation section for performing superimposition processing of two measured results associated with switching by said changeover section.

5. The wavelength dispersion distribution measuring apparatus of an optical fiber according to claim 4, wherein said changeover section comprises:

a first and a second changeover switches for selectively performing switching to the side connected to both of the end sides of the measured optical fiber respectively and the side connected to the terminator side respectively, and a third changeover switch for selectively switching the measured optical fiber side of said first and second changeover switches to the input side of the light pulse signal.

* * * * *